AUXILIARY BEAM DEFLECTION YOKE

Filed Dec. 14, 1965

INVENTOR.
ROBERT L. BARBIN
BY W. H. Sprouagle
Attorney

INVENTOR.
ROBERT L. BARBIN
BY
W. H. Sprague
Attorney

United States Patent Office 3,424,942
Patented Jan. 28, 1969

3,424,942
AUXILIARY BEAM DEFLECTION YOKE

Robert L. Barbin, Indianapolis, Ind., assignor to Radio Corporation of America, a corporation of Delaware Filed Dec. 14, 1965, Ser. No. 513,774
U.S. Cl. 315—27 7 Claims
Int. Cl. H01j 29/70

ABSTRACT OF THE DISCLOSURE

In a color television image reproducing system embodying a multiple electron beam shadow mask type of color picture tube, an auxiliary beam deflection yoke mounted adjacent the main deflection yoke is provided. The auxiliary yoke is energizable as functions of temperature and beam deflection angle for modifying the effective deflection centers of the electron beams.

This invention relates to cathode ray tube deflection systems and particularly to apparatus by which to control wide angle beam deflection in television picture tubes such as, for example, shadow mask type color picture tubes.

In order to achieve wide angle beam deflection with good color purity in shadow mask color television picture tubes, it is necessary not only to maintain accurate coincidence of the effective horizontal and vertical deflection centers but also to insure that the effective deflection centers are proper under all conditions to direct the electron beams through the appropriate apertures in the shadow mask to strike the desired phosphor elements. The beam deflection apparatus in such a cathode ray tube must effect not only the wide angle deflection of the beams to scan a raster at the luminescent screen, but also must function with a minimum of coma, astigmatism, degrouping and other undesired electron-optical effects. When the deflection angle becomes relatively great, such as 90° or more, it is difficult to design a single yoke by which to achieve all of the desired results.

Another problem encountered with wide angle beam deflection systems is that resulting from structural deformations occurring within the picture tube itself under varying temperature conditions. For example, the shadow mask in a color television picture tube may become distorted relative to the phosphor screen at elevated temperatures. It is desirable that some modification of one or both of the effective beam deflection centers be made as some function of the temperatures within the tube. Such deflection center modification is particularly desirable in rectangular tubes because of the tendency of a rectangularly shaped shadow mask to become unsymmetrically distorted at elevated temperatures. Distortions of the character described, detract from color purity in such picture tubes.

It, therefore, is an object of the present invention to provide beam deflection apparatus by which to modify the effective horizontal and/or vertical deflection centers of a cathode ray picture tube as a function of the environmental temperature and without adversely effecting the beam convergence, raster shape, etc.

In accordance with this invention, there is provided a deflection system for a cathode ray picture tube which includes a main deflection yoke which is energizable from suitable deflection wave sources to deflect one or more electron beams appropriately to scan a substantially rectangular raster at a target electrode. The system also includes an auxiliary deflection yoke of such configuration that, when suitably energized, the effective deflection center of the main yoke is modified to maintain good color purity of the reproduced picture.

The auxiliary beam deflection yoke includes a substantially circular ferromagnetic core and two respective pairs of horizontal and vertical windings. Each pair of auxiliary yoke windings is placed in toroidal fashion about the core with each winding extending around approximately one-half of the core. The two windings of each pair are on diametrically opposite sides of the core and the corresponding horizontal and vertical windings are displaced from one another circumferentially of said core by approximately 90°. The horizontal windings are interconnected in a manner to produce a substantially horizontal beam deflection field when energized. Similarly, the vertical windings are interconnected to produce a vertical beam deflection field when energized.

In one illustrative embodiment of the invention, each of the auxiliary yoke windings comprises a single coil wound spirally about the core. In another form of the invention each of the windings comprises a plurality of suitable interconnected individual coils mounted at spaced points around the circumference of the core. In illustrative forms of the invention each winding has a varied distribution of turns which is a minimum at its terminals and which gradually increases to a maximum at a point substantially midway between the terminals.

For a better understanding of the invention, reference now is made to the following description which is taken in conjunction with the accompanying drawings, of which:

Figures 1, 2, 3:
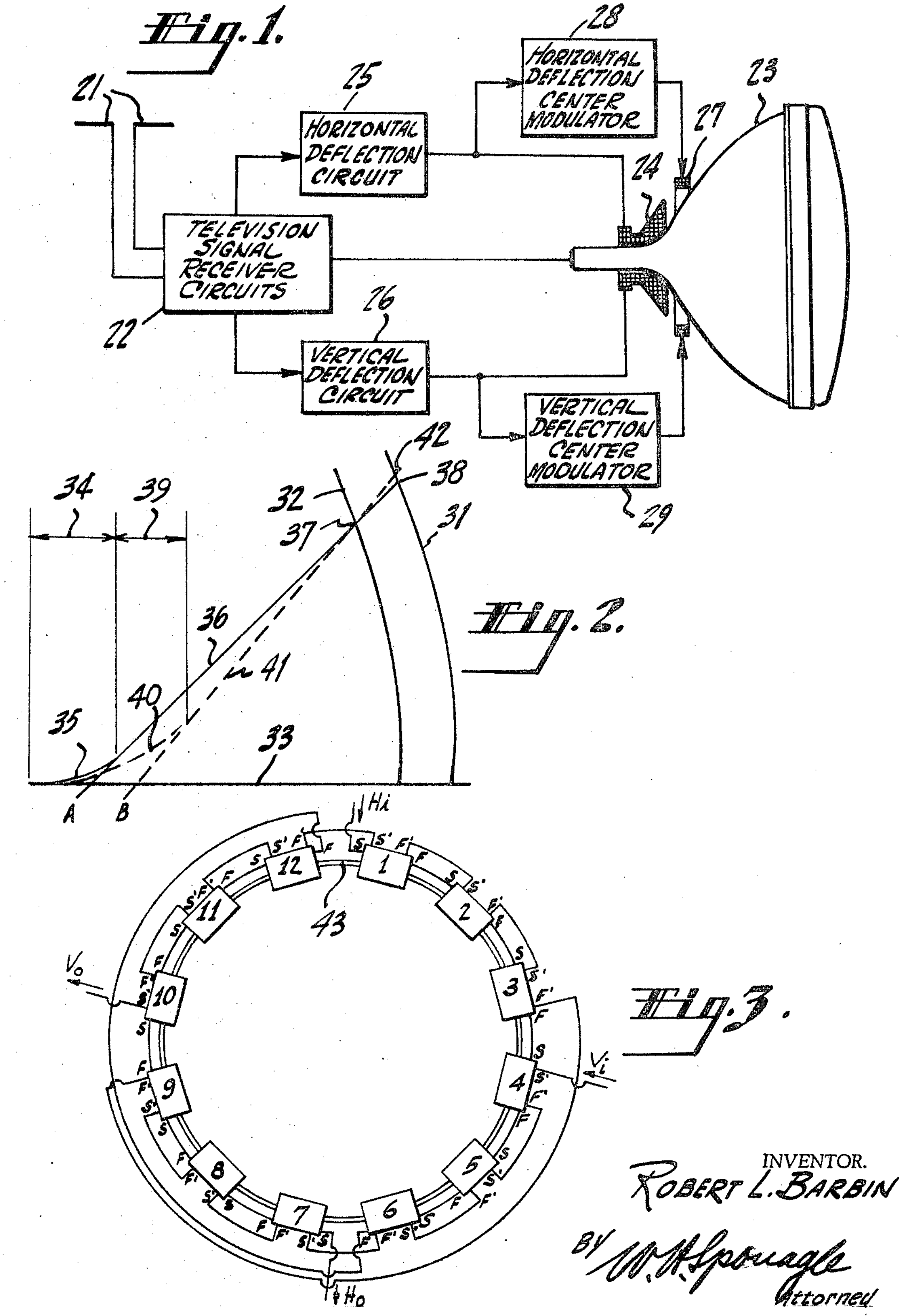
FIGURE 1 is a block diagrammatic representation of a television receiver embodying the color purity apparatus of the invention.
FIGURE 2 is a graphical illustration of the effect of modifying the effective beam deflection center by apparatus embodying the invention.
FIGURE 3 is a representation of a form of an auxiliary beam deflection yoke comprising a plurality of individual coils in accordance with the invention.

In the block diagram of FIGURE 1, television signals intercepted by the antenna 21 are impressed upon and processed by the usual television signal receiver circuits 22 from which are derived the video signals which are impressed upon the electron gun structure of image reproducing device such as a color picture tube 23. The picture tube may be a 25-inch RCA type 25AP22 which has a substantially rectangular screen and is one in which three electron beams are deflected by means including a main beam deflection yoke 24 through angles up to approximately 90°. It is to be understood, however, that the invention may also be used with other types of picture tubes such as, for example, a 21-inch RCA type 21FBP22A which has a round screen and is one in which the electron beams are deflected through angles up to approximately 70°. The main deflection yoke 24 may be of the 90° variety such as disclosed in Patent 3,169,207 granted Feb. 9, 1965 to M. J. Obert and R. L. Barbin when a picture tube of the 25-inch rectangular variety is used. The yoke 24 alternatively may be of the type disclosed in Patent 2,824,267 granted Feb. 18, 1958 to W. H. Barkow when a picture tube of the 70° round variety is used. It is to be understood, however, that the present invention is not necessarily limited to use with such tubes and yokes as those referred to, but also may be used with substantially equal facility with other types of tubes such as a 19" rectangular tube identified as RCA type 12EYP22, for example. The main deflection yoke 24 has a pair of horizontal coils and a pair of vertical coils which are energized respectively by waves derived from a horizontal deflection circuit 25 and a vertical deflection circuit 26, both of which are controlled by suitable signals received from the receiver circuit 22.

The picture tube 23 also is provided with an auxiliary beam deflection yoke 27 in accordance with the present invention. It comprises a pair of horizontal windings and a pair of vertical windings which are energized respectively by suitable waves derived from a horizontal deflection center modulator 28 and a vertical deflection center modulator 29. These modulators are controlled by signals derived from the respective horizontal and vertical deflection circuits 25 and 26. The modulators may be of the character shown in either of the concurrently filed applications of N. W. Hursh, Ser. No. 513,739 titled "Dynamic Color Purity Apparatus" or of E. Lemke and N. W. Hursh, Ser. No. 513,693 titled "Energizing System for Color Purity Apparatus."

Before considering in greater detail the configuration of the auxiliary beam deflection yoke 27 in accordance with the present invention, reference is made to FIGURE 2 for an explanation of the manner in which such a yoke functions to accomplish the desired modification of the effective beam deflection center so as to achieve good color purity in the reproduced picture under various operating conditions. In this figure, the line 31 represents the screen of the picture tube, on the concave surface of which are deposited the phosphor elements which may be excited to reproduce a color picture. The line 32 represents the shadow mask of the picture tube which, as is well known, comprises a great number of apertures through which the electron beams pass to impinge upon the proper phosphor dot elements of the screen 31. First, consider the path of an electron beam when influenced only by the main deflection yoke 24 of FIGURE 1. The field produced by the main yoke extends along the axis 33 of the picture tube for a distance approximately represented by the line 34. While traversing this field, the electron beam, which is assumed to be following a path from the electron gun along the tube axis 33, is deflected so as to follow a curved path 35. As soon as it leaves the field of the main deflection yoke, it continues in a straight line 36 in the direction last given to it by the main deflection yoke field. It then passes through a given aperture 37 of the shadow mask 32 and impinges upon a phosphor area 38. By projecting the line 36 backward to the intersection with the tube axis 33, the intersection point A is commonly referred to as the effective deflection center of the yoke.

Now consider the operation of the beam deflection apparatus when the auxiliary yoke 27 is in a position generally represented in FIGURE 1 and is energized by the modulators 28 and 29. The extent of the field produced by the auxiliary yoke, to the influence of which the electron beam is subjected, is generally represented by the line 39 of FIGURE 2. The electron beam now follows the broken line path which is seen to have a first curved section 40 while it is traversing the fields produced by the main deflection yoke 24 and the auxiliary deflection yoke 27. As soon as the beam emerges from the field produced by the auxiliary yoke, it again follows a straight path 41 through the same aperture 37 of the shadow mask 32. In this case, however, the beam impinges upon a phosphor element 42. The backward projection of the straight line path 41 of the electron beam intersects the tube axis line 33 at point B which is termed the modified effective beam deflection center. Thus, it is seen that the use of the auxiliary deflection yoke produces a modification of the effective deflection center of the system, whereby in this instance the effective center is moved forwardly from point A to point B. It is to be understood that a suitably different energization of the auxiliary yoke 27 and/or a different location thereof, such as in back of the main yoke 24, may be effected to produce a rearward modification or switching of the deflection center.

It will be seen by those skilled in the art that such apparatus may be usefully employed to achieve good color purity of the image reproduced by the picture tube when, for example, there may be a radial misregister of the apertures of the shadow mask 32 with the groups of phosphor elements of the screen 31. In the illustrative example shown in FIGURE 2, if the impingement of the electron beam upon the element 37 is incorrect and thereby produces color impurities in the reproduced picture, the effective deflection center of the beam may be altered to cause the beam to impinge upon the proper phosphor element 42. Such radial misregister may be produced when the main deflection yoke is not in proper position on the neck of the color picture tube. Alternatively, should some deformation of the shadow mask 32 be encountered during operation of the picture tube, such as when rectangular picture tubes are used, the energization of the auxiliary deflection yoke 27 may be altered during operation as functions of the particular deflection angle and/or of the environmental temperature of the picture tube in a manner to compensate for such deformation.

One form of an auxiliary beam deflection yoke in accordance with the present invention is shown in FIGURE 3. It comprises a series of individual coils 1–12 spaced substantially equally around a substantially circular core 43. This core may comprise a number of turns (8 for example) of Triple X oriented strip steel having a thickness of about 0.011 inch and approximately half an inch wide. Each of the coils comprises a horizontal winding and a vertical winding. The horizontal windings of coils 1–6 are connected in series as indicated by connecting the finish F of coil 1 to the start S of coil 2, for example, and the horizontal windings of the coils 7–12 are connected in series in reverse order as, for example, by connecting the finish F of coil 6 to the finish F of coil 12 and the start S of the coil 12 to the finish F of coil 11 and so on. Instantaneous current, for example, entering the horizontal coil system at point $H_i$ and exiting at point $H_o$ produces a magnetic field inside of the coil structure of a character suitable to deflect the electron beams horizontally as viewed in this figure.

The vertical windings of the coils 1–12 also are interconnected so as to produce a magnetic field within the yoke structure of a character suitable to deflect the electron beams vertically as viewed in this figure. The production of the vertical deflection field at right angles to the horizontal deflection field is effected by this apparatus by connecting the vertical windings of coils 4–9 in that order in series such as by, for example, connecting the finish F′ of coil 4 to the start of S′ of coil 5 through coils 6, 7 and 8 and so on to coil 9. The finish F′ of coil 9 is connected to the finish F′ of coil 3 and the start S′ of coil 3 is connected to the finish F′ of coil 2 and so on successively through coils 1, 12, 11 and 10 in that order. Instantaneous current, therefore, entering the vertical deflection system at point $V_i$ tranverses coils 4–9 in that order and then traverses coils 3, 2, 1, 12, 11 and 10 in that order, exiting at the point $V_o$.

A convenient way of assembling the auxiliary yoke structure of FIGURE 2 is to place the coils 1–12 in the desired positions on a circular mandrel having an inside diameter which is approximately equal to that of the finished structure. The desired number of turns of the strip material comprising the core 43 then are threaded through the coils. The ends of the strip material are suitably anchored, after which the mandrel is withdrawn.

Both the vertical and horizontal windings are distributed in a manner to produce the desired auxiliary vertical and horizontal beam deflection fields. In the structure of FIGURE 3, this is accomplished by providing different numbers of turns in the various coils 1–12. In each of these coils, the horizontal winding is first placed in layer form on a suitable bobbin and the vertical winding, also in layer form, is placed over the horizontal winding. The turns distribution of one particular successfully operated embodiment of this form of the invention has been accomplished in accordance with the following table A:

TABLE A

| | No. Turns Horizontal | No. Turns Vertical |
|---|---|---|
| Coil: | | |
| 1 | 9 | 55 |
| 2 | 39 | 30 |
| 3 | 66 | 6 |
| 4 | 66 | 6 |
| 5 | 39 | 30 |
| 6 | 9 | 55 |
| 7 | 9 | 55 |
| 8 | 39 | 30 |
| 9 | 66 | 6 |
| 10 | 66 | 6 |
| 11 | 39 | 30 |
| 12 | 9 | 55 |

Figures 4, 5, 6:
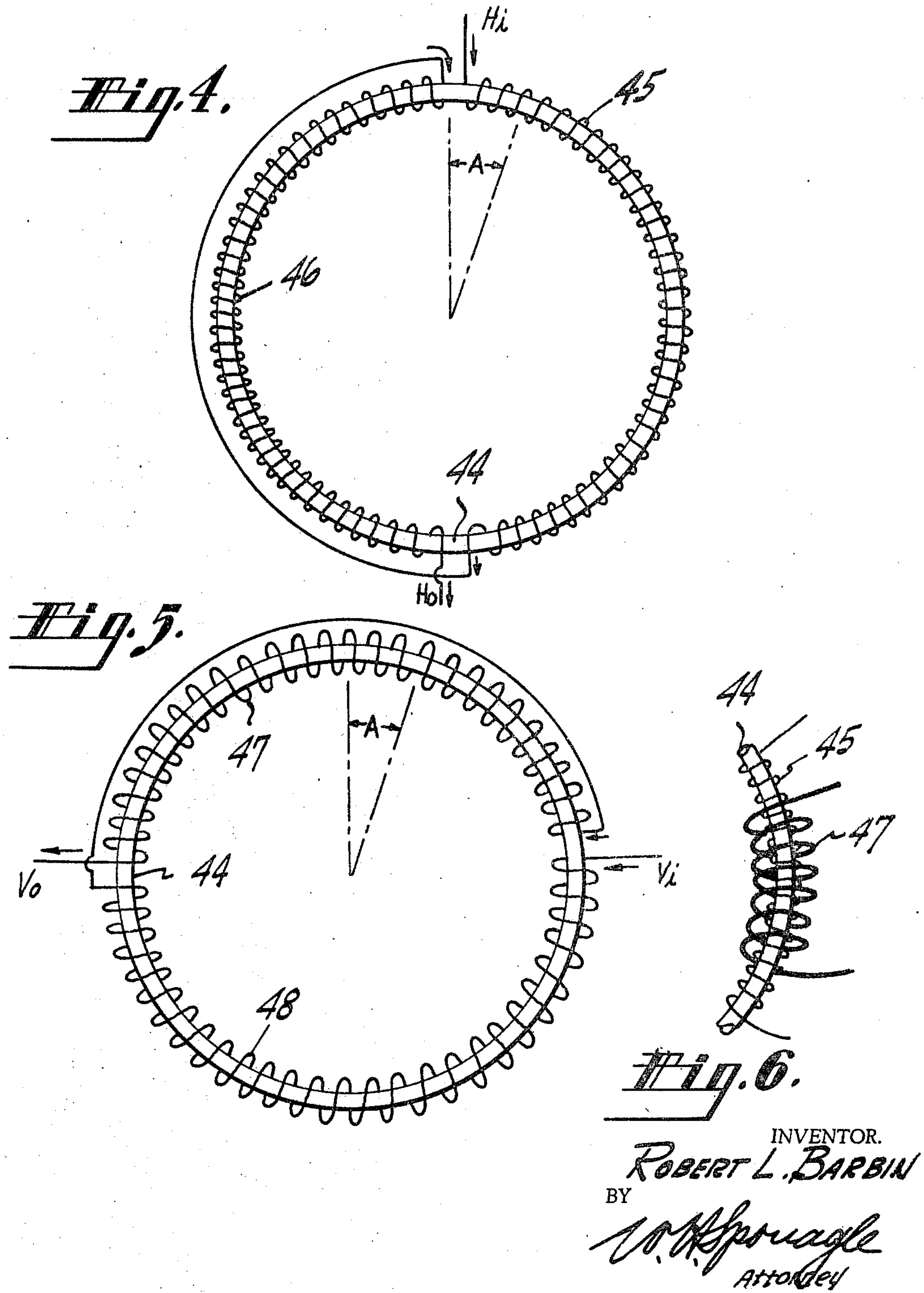
FIGURES 4, 5 and 6 are views of a form of an auxiliary beam deflection yoke comprising spirally wound coils in accordance with the invention.

In aonther form of the invention such as is illustrated in FIGURES 4, 5 and 6, the vertical and horizontal windings of the auxiliary deflection yoke are spirally wound about a core 44 which may consist of a number of turns (14 for example) of Armco oriented T steel having a thickness of approximately 0.006 inch and about a half inch wide. Two horizontal windings, 45 and 46 are effectively wound in a spiral fashion around the core 44 so that each extends around approximately half of the core. As illustrated in FIGURE 4, the coils 45 and 46 extend respectively around the right and left hand halves of the core 44. The two windings are interconnected substantially as shown so that instantaneous current entering at point $H_i$ traverses first the coil 45 and then the coil 46 and finally exits at point $H_o$ and produces a suitable magnetic field within the auxiliary yoke which is effective to deflect the electron beams horizontally.

In FIGURE 5, the vertical windings, 47 and 48, are shown spirally wound respectively about the upper and lower halves of the core 44. The two windings are interconnected in such a manner that instantaneous current entering at point $V_i$ first traverses coil 48 and then coil 47 finally exiting at point $V_o$ thereby producing a suitable magnetic field within the auxiliary yoke by which to effect a vertical deflection of the electrical beams. In a preferred form of this modification of the invention, the horizontal windings 45 and 46 are first placed on the core 44 and the vertical windings 47 and 48 are then placed over the horizontal windings. Such an arrangement is illustrated fragmentarily in FIGURE 6.

As in the other form of the invention described with reference to FIGURE 3, the horizontal and vertical windings have varied turns distribution whereby to produce the desired fields. The turns distribution, which has been successfully used in a practical form of this embodiment of the invention, is given in the following table B with reference to angle A, thereby indicating in both FIGURES 4 and 5 the turns distribution at any circumferential point of the yoke structure.

TABLE B

| | No. Horizontal Turns | No. Horizontal | | No. Vertical Turns | No. Vertical | |
|---|---|---|---|---|---|---|
| | | Turns | Degree | | Turns | Degree |
| Angle A (Degrees): | | | | | | |
| 0–7½ | 0 | 0 | --------- | 7 | --------- | .933 |
| 7½–22½ | 0 | 0 | --------- | 13 | --------- | .866 |
| 22½–37½ | 3 | --------- | .200 | 10 | --------- | .667 |
| 37½–52½ | 7 | --------- | .467 | 8 | --------- | .533 |
| 52½–67½ | 9 | --------- | .600 | 4 | --------- | .266 |
| 67½–82½ | 12 | --------- | .800 | 1 | --------- | .067 |
| 82½–97½ | 13 | --------- | .866 | 0 | 0 | --------- |
| 97½–112½ | 12 | --------- | .800 | 1 | --------- | .067 |
| 112½–127½ | 9 | --------- | .600 | 4 | --------- | .266 |
| 127½–142½ | 7 | --------- | .467 | 8 | --------- | .533 |
| 142½–157½ | 3 | --------- | .200 | 10 | --------- | .667 |
| 157½–172½ | 0 | 0 | --------- | 13 | --------- | .866 |
| 172½–180 | 0 | 0 | --------- | 7 | --------- | .933 |
| 180–187½ | 0 | 0 | --------- | 7 | --------- | .933 |
| 187½–202½ | 0 | 0 | --------- | 13 | --------- | .866 |
| 202½–217½ | 3 | --------- | .200 | 10 | --------- | .667 |
| 217½–232½ | 7 | --------- | .467 | 8 | --------- | .533 |
| 232½–247½ | 9 | --------- | .600 | 4 | --------- | .266 |
| 247½–262½ | 12 | --------- | .800 | 1 | --------- | .067 |
| 262½–277½ | 13 | --------- | .866 | 0 | 0 | --------- |
| 277½–292½ | 12 | --------- | .800 | 1 | --------- | .067 |
| 292½–307½ | 9 | --------- | .600 | 4 | --------- | .266 |
| 307½–322½ | 7 | --------- | .467 | 8 | --------- | .533 |
| 322½–337½ | 3 | --------- | .200 | 10 | --------- | .667 |
| 337½–352½ | 0 | 0 | --------- | 13 | --------- | .866 |
| 352½–360 | 0 | 0 | --------- | 7 | --------- | .933 |

The auxiliary beam deflection yoke disclosed herein constitutes practical apparatus which may be operated under the control of either of the systems disclosed in the concurrently filed Lemke, et al. and Hursh applications to effectively modify the deflection center of a cathode ray picture tube as a function of the environmental temperature to produce color pictures of good color purity.

What is claimed is:

1. In a color television image reproducing system embodying a multiple electron beam shadow mask type of color picture tube provided with a main beam deflection yoke energized by substantially sawtooth currents respectively at line and field repetition rates to scan a raster at a screen having a multiplicity of groups of different color-producing phosphor dots;

an auxiliary beam deflection yoke mounted adjacent to said main deflection yoke [and energizable as functions of temperature and beam deflection angle for modifying the effective deflection centers of said electron beams] comprising:

a substantially circular ferromagnetic core;

a pair of horizontal windings placed in toroidal fashion about said core and extending respectively around approximately one half of said core on diametrically opposite sides thereof, said horizontal windings being interconnected in a manner to produce a substantially horizontal transverse beam deflection field where energized;

a pair of vertical windings placed in toroidal fashion about said core and extending respectively around approximately one half of said core on diametrically opposite sides thereof, and displaced circumferentially of said core approximately 90° from said pair of horizontal windings;

said vertical winding being interconnected in a manner to produce a substantially vertical beam deflection field when energized; and means coupled to said horizontal and vertical windings for energizing said windings for modifying the effective deflection centers of said electron beams as functions of ambient temperature and beam deflection angle;

whereby color purity variations resulting from environmental temperature variations are minimized.

2. In a color television image reproducing system embodying a multiple electron beam shadow mask type of color picture tube provided with a main beam deflection yoke energized by substantially sawtooth currents respectively at line and field repetition rates to scan a raster at a screen having a multiplicity of groups of different color-producing phosphor dots;

an auxiliary beam deflection yoke mounted adjacent to said main deflection yoke and energizable as functions of temperature and beam deflection angle for modifying the effective deflection centers of said electron beams comprising:

a substantially circular ferromagnetic core;

a pair of horizontal windings placed in toroidal fashion about said core and extending respectively around approximately one half of said core on diametrically opposite sides thereof, said horizontal windings being interconnected in a manner to produce a substantially horizontal transverse beam deflection field where energized; and a pair of vertical windings placed in toroidal fashion about said core and extending respectively around approximately one half of said core on diametrically opposite sides thereof, and displaced circumferentially of said core approximately 90° from said pair of horizontal windings, said vertical winding being interconnected in a manner to produce a substantially vertical beam deflection field when energized, each of said windings has a varied distribution of turns which is minimum at its terminals and which gradually increases therefrom to a maximum at a point substantially midway between said terminals.

3. An auxiliary beam deflection yoke as defined in claim 2 wherein, each of said windings comprises a single coil continuously wound spirally about said core.

4. An auxiliary beam deflection yoke as defined in claim 3 wherein, the varied distribution of turns of each of said spirally wound coils is in discrete steps.

5. An auxiliary beam deflection yoke as defined in claim 2 wherein, each of said windings comprises a plurality of interconnected individual coils mounted at spaced points around the circumference of said core.

6. An auxiliary beam deflection yoke as defined in claim 5 including, a plurality of bobbins having at least one of said coils layer wound thereon.

7. An auxiliary beam deflection yoke as defined in claim 6 wherein, each of said bobbins supports one horizontal coil and one vertical coil.

References Cited

UNITED STATES PATENTS

| | | | |
|---|---|---|---|
| 2,719,249 | 9/1955 | Friend | 313—77 |
| 2,834,901 | 5/1958 | Barkow | 315—27 |

RODNEY D. BENNETT, *Primary Examiner.*

JOSEPH G. BAXTER, *Assistant Examiner.*

U.S. Cl. X.R.

313—76, 77

UNITED STATES PATENT OFFICE
CERTIFICATE OF CORRECTION

Patent No. 3,424,942

January 28, 1969

Robert L. Barbin

It is certified that error appears in the above identified patent and that said Letters Patent are hereby corrected as shown below:

Column 5, line 63, "electrical" should read -- electron --. Column 6, lines 41 to 44, cancel "[and energizable as functions of temperature and beam deflection angle for modifying the effective deflection centers of said electron beams]".

Signed and sealed this 31st day of March 1970.

(SEAL)
Attest:

Edward M. Fletcher, Jr.
Attesting Officer

WILLIAM E. SCHUYLER, JR.
Commissioner of Patents